Oct. 12, 1948.   J. H. JEFFREE   2,450,965
METHOD OF DETERMINING CORRECT CURVATURES
OF LENSES AND SPACINGS THEREOF
Filed Feb. 23, 1945

John H. Jeffree
Inventor
by his attorneys
Stebbins, Blenko & Webb

Patented Oct. 12, 1948

2,450,965

UNITED STATES PATENT OFFICE 2,450,965

METHOD OF DETERMINING CORRECT CURVATURES OF LENSES AND SPACINGS THEREOF

John Henry Jeffree, Cobham, England, assignor to Combined Optical Industries Limited, Slough, England, a British company Application February 23, 1945, Serial No. 579,392
In Great Britain October 29, 1943

5 Claims. (Cl. 88—57)

This invention relates to the production of lenses and of optical systems, and particularly to an improved method for testing and determining correct curvatures of lens surfaces and correct combinations of lenses and lens surfaces (i. e., the relative dimensions and dispositions of the components of a proposed system). The objects of the invention comprise the provision of a method whereby the determinations of the curvatures, dimensions, and spacings of lenses and proposed systems of lenses may be accomplished in a particularly simple and effective manner. In this specification where the context permits the expression "lens" includes other optical elements such as prisms or mirrors.

An important part of the whole process of production of lenses, lens systems and optical systems generally is the devising, computation and checking of designs. This part, indeed, is often one of the most laborious and time-consuming in the whole process of lens-production.

This part, when carried out by known methods, comprises calculations directed to determine the exact paths taken by light directed in various ways through proposed systems, and it comprises also the testing of actual systems constructed under the guidance afforded by such calculations.

It would theoretically be possible to dispense with calculation and determine experimentally by constructing and testing many actual systems, the facts usually found by calculation, but the expense of constructing such systems would normally be greater than that of calculation.

It is a known fact that most of the information needed to perfect optical designs can be obtained from consideration of the paths taken by light through a single plane of each proposed system which plane includes the optical axis. The determination of such paths in an axial plane is accordingly the aim of most optical calculation in practice.

The present invention facilitates the design of optical systems by determining experimentally the paths taken by light directed through arrangements of pieces of optical media shaped to represent axial sections or slices of proposed systems. For instance, if a single spherical lens is under consideration, made of particular material and with particular curvatures on either side, and having a particular thickness, then a piece of a flat sheet of the same material or of another with sufficiently similar optical properties is taken, and its edges are cut to curves equal or proportional to those of the proposed lens and at a distance apart proportional to its thickness, and said curved edges are then polished, a cylindrical lens is the result, whose length along the cylindrical axis is the thickness of the sheet taken, but the curved sides of which correspond to the axial curves of the proposed spherical lens.

The resulting test section, as such cylindrical lenses will hereafter be called, may be placed on a board, sheet or convenient support, and caused to form images, on ground glass or in the field of view of a microscope or elsewhere, of objects suitably placed in its plane; and a study of such images can be used to expedite the design of optical systems.

The invention is particularly applicable to the production of optical systems in the so-called optical plastics, such as the methacrylate resins, polystyrene, and the like. Test sections of such material can generally be cut with an ordinary lathe of good quality, to a sufficient accuracy for the purpose of this invention, if precautions are taken against vibration, the cutting tool is suitably sharp and the machine in good adjustment. The cut edges can be polished by gentle rubbing with the hand, or a cloth, charged with suitable polishing agents, care being taken to polish all parts of the cut edges equally.

Test sections of non-circular curves corresponding to aspherical lenses can be cut by suitable machine arrangements, and polished similarly to the above. For instance, elliptical curves are easily obtained by milling with a cutter having a motion of translation normal to the test section and one of rotation about an axis inclined at an appropriate angle thereto.

Where appropriate, as with glasses, the test sections may be formed by grinding or lapping, and polished in any convenient manner by known methods.

The nature of this invention and of subsidiary features thereof will be appreciated from the following description of examples, reference being made to the accompanying drawings, in which.

Figure 1:
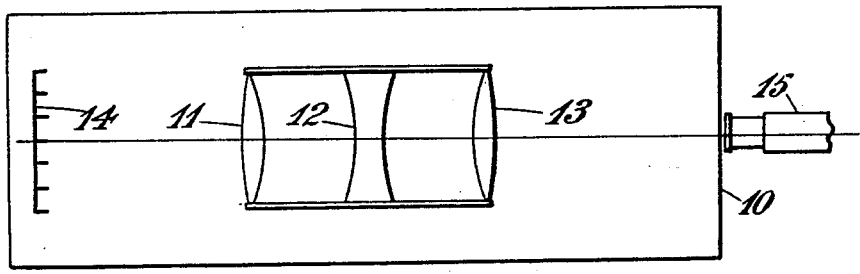
Figure 1 is a diagram of one form of the device embodying the invention.

Referring first to Figure 1, on a flat board 10 are placed three flat test sections or slices 11, 12, 13 the edges of which are normal to the board and the three test sections may be positioned on the board on a common optical axis. 14 represents an object and this can of course take a great variety of forms and can be provided with projections or markings which are normal to the optical axis and parallel with the board or normal to the board or at various angles to the board. Conveniently the object 14 may consist of or comprise a light source. 15 diagrammatically represents the objective of a microscope.

Figure 2:
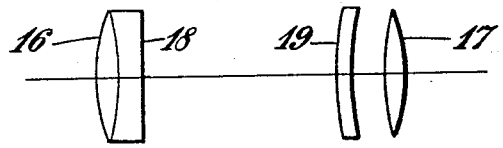
Figure 2 is a diagram of one lens combination under test.

Figure 2 refers to the test sections used in the production of a projection lens of the Petzval type having its optical components made of methyl methacrylate polymer and of polystyrene. The test sections 16 and 17 are of methyl methacrylate polymer while the sections 18 and 19 are of polystyrene, the sections 16 and 18 being cemented together.

In this case an approximate set of curvatures for the four component lenses was decided by calculations referring to Seidel aberrations and based on the known curvatures of glass systems of similar type. Test sections were cut to twice the dimensions of the curves thus decided, and were set up on a board at the appropriate separations, and light from a narrow source in the plane of the sections was directed through the system. Exploration of the resulting image revealed a sufficiently flat field of view but also revealed the presence of a little coma and spherical aberration whose amount was approximately measured. The alterations to the cemented pair of lenses 16 and 18 necessary to correct these defects being computed on the basis of Seidel aberrations, a correspondingly altered pair of test sections were made and showed that almost complete correction of spherical aberration and coma had been attained. The remaining very small errors were again evaluated by measurement and a second very small correction to the curves of the cemented lenses computed as before. Dies were made to mould actual lenses to these twice corrected curvatures, and the lenses thus moulded proved to yield a projection system of high correction for spherical aberration and coma and with a suitably flat field.

Figure 3:
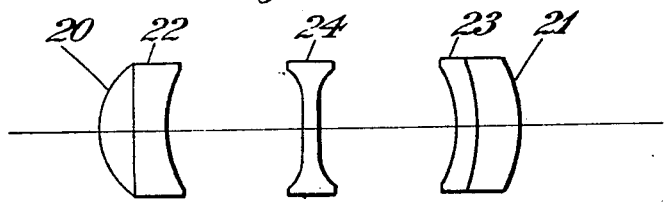
Figure 3 is a diagram of a second lens combination under test.

A second example relates to the production of aspheric anastigmat lenses. Preliminary experiments and rough calculations suggested that anastigmatic photographic objectives could be made of the type shown in Figure 3 where 20 and 21 are positive lenses of methyl methacrylate polymer cemented to negative lenses 22 and 23 respectively made of polystyrene, and 24 is a unit made of methyl methacrylate polymer such as would be made by moulding providing negative spherical aberration but no paraxial power. A preliminary set of curves for such a system having been computed on the basis of Seidel aberrations, test sections were made up, the section 24 being cut in a series of steps on a specially adjusted machine with fine micrometer motions, and then smoothed and polished. The test sections being mounted and tested as previously described revealed at once that the negative variation of spherical aberration with increasing angle of view, due to the oblique passage of the light through 24, was so great as to render the system of no practical value at large apertures.

Accordingly it was decided to apply the necessary negative spherical aberration correction directly to the concave faces of 22 and 23 by making these curves elliptical. Preliminary calculations were accordingly made of the necessary paraxial curvatures and thicknesses to give a symmetrical system corrected for Petzval curvature and approximately for longitudinal chromatic aberration, and test sections were cut to these curves and thicknesses, using the milling process, previously mentioned for the elliptical curves. A number of such elliptical sections of the same paraxial curvature but with varying amounts of ellipticity were made, and the required ellipse determined from the results of tests by a process of bracketing. The same curve was used in each case for 22 and 23 to facilitate subsequent manufacture, and also, to begin with, the same spherical outer curve for 20 and 21. When the required ellipse had been approximately decided, variations were also introduced in the interface curves of the test sections corresponding to cemented surfaces in the actual lenses. By suitable choice of these curves and of the relative thicknesses of the components it proved possible to correct coma and transverse chromatic aberration, the alterations in the test sections being made under the guidance of approximate computations of changes of Seidel aberrations, which could be made with little labour. The correction of distortion was not considered in this case, as it was obviously not very serious.

To facilitate the tests of variation in interface curvatures, each elliptical curvature was cut on a stack of several plates of polystyrene, so that a number of test sections could thereafter be made embodying that particular ellipse together with various circular curves.

Figure 4:
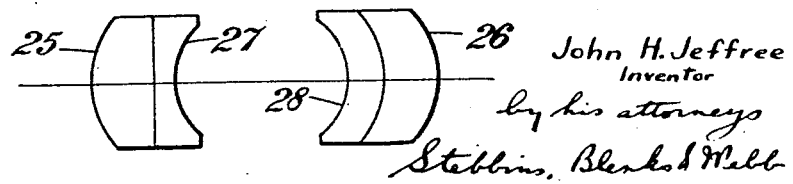
Figure 4 is a diagram of a third combination under test.

These tests led with precision to a type of anastigmat lens such as is shown in Figure 4 wherein 25 and 26 are lenses made of methyl methacrylate polymer having equal outer convex spherical curvatures, and 27 and 28 are polystyrene lenses having equal inner concave elliptical curves, the whole being substantially well corrected for the Seidel aberrations and free from objectionable aberrations of higher orders, at a relative aperture of f/3.5. Dies were made to the curves thus decided on, and lenses moulded therefrom which confirmed the accuracy of the design.

It may be mentioned that where cemented surfaces are proposed in the real lens, the corresponding surfaces of the test sections may be readily cemented also with soft Canada balsam, thus facilitating the tests and improving their accuracy. The same substance is convenient for cementing them to the board in which they are to be mounted for testing, as it secures them firmly but permits movement when desired.

It is convenient in testing such sections to mount them on boards on which squared paper has previously been pasted, so that their accurate alignment is facilitated by reference to the ruled squares, and the positions of focus, curvature of field and the like may be marked on the paper. It is also advantageous to make the dimensions of the test sections greater than those of the actual lenses they represent to increase the proportional accuracy of the tests.

I claim:

1. The method of determining the correct curvatures and dispositions of the surfaces of lenses in a proposed lens system, which comprises, forming thin test pieces of optical media similar to those to be employed in said system, representing axial sections of the components of said system, with their edges shaped proportionally to the curvatures deemed approximately correct for the said components, arranging the same in one plane on a common optical axis between an object and an observation point at distances apart between curved surfaces deemed appropriate for the lens surfaces in such system with said edges normal to a plane including said optical axis, directing light from said object through said test pieces, examining the resulting image at said observation point to determine the paths taken by the light through the test system, and forming other test pieces with curvatures of their edges altered with a view to correcting optical errors determined by such examination, substituting them, appropriately spaced, for test components previously used, and repeating the above described operations as required with altered test components until desired curvatures and disposition of the lenses of the proposed system are determined.

2. In a method of determining the correct curvatures and dispositions of the surfaces of lenses in a proposed lens system, the steps comprising, forming thin test pieces of optical media similar to those to be employed in said system, representing axial sections of the components of said system, by shaping curvatures deemed approximately correct for said components upon the edges of flat sheets of said media, arranging the same upon a flat surface on a common optical axis between an object and an observation point at distances apart between curved surfaces deemed appropriate for the lens surfaces in such system with said edges normal to a plane including said optical axis, directing light from said object through said test pieces, examining the resulting image at said observation point to determine the paths taken by the light through said test pieces, and forming other test pieces with curvatures of their edges altered with a view to correcting optical errors determined by such examination, substituting them, appropriately spaced, for test components previously used, and repeating the above described operations as required with altered test components until desired curvatures and disposition of the lenses of the proposed system are determined.

3. In a method of determining the correct curvatures and dispositions of the surfaces of lenses in a proposed lens system, the steps comprising, forming thin test pieces of optical media similar to those to be employed in said system, representing axial sections of the components of said system, by shaping curvatures deemed approximately correct for said components upon the edges of flat sheets of said media with the curvatures and axial dimensions of the test pieces greater than but proportional to those of the lenses, axial sections of which they represent, arranging the same upon a flat surface on a common optical axis between an object and an observation point at distances apart between curved surfaces deemed appropriate for the lens surfaces in such system with said edges normal to a plane including said optical axis, directing light from said object through said test pieces, examining the resulting image at said observation point to determine the paths taken by the light through said test pieces, and forming other test pieces with curvatures of their edges altered with a view to correcting optical errors determined by such examination, substituting them, appropriately spaced, for test components previously used, and repeating the above described operations as required with altered test components until desired curvatures and disposition of the lenses of the proposed system are determined.

4. In a method of determining the correct curvatures and dispositions of the surfaces of lenses to be formed of optical plastics in a proposed lens system, the steps comprising, forming thin test pieces of optical plastics the same as are to be used in said system, representing axial sections of the components thereof, by shaping curvatures proportional to those deemed approximately correct for said components upon the edges of flat sheets of said plastics, arranging the same upon a flat surface on a common optical axis between an object and an observation point at distances apart between curved surfaces deemed appropriate for the lens surfaces in such system with said edges normal to a plane including said optical axis, directing light from said object through said test pieces, examining the resulting image at said observation point to determine the paths taken by the light through said test pieces, and forming other test pieces with curvatures of their edges altered with a view to correcting optical errors determined by such examination, substituting them, appropriately spaced, for test components previously used, and repeating the above described operations as required with altered test components until desired curvatures and disposition of the lenses of the proposed system are determined.

5. In a method of determining the correct curvatures of the surfaces of lenses in a proposed lens system, the steps comprising, forming thin test pieces of optical media similar to those to be employed in said system, representing axial sections of the components thereof, by shaping curvatures proportional to those deemed approximately correct for said components upon the edges of flat sheets of said media, said curvatures being determined by calculations for correcting Seidel aberrations in lenses of similar type, arranging the same upon a flat surface on a common optical axis between an object and an observation point at distances apart between curved surfaces deemed appropriate for the lens surfaces in said system with said edges normal to a plane including said optical axis, directing light from said object through said test pieces, examining the resulting image at said observation point to determine the paths taken by the light through said test pieces, approximately measuring the amount of optical defect of the system disclosed by such examination, forming other test pieces with their edge curvatures altered by calculations on the basis of Seidel aberrations disclosed, to correct the same approximately, substituting them, appropriately spaced, for test components previously used, and repeating the above described operations with the reconstituted test system.

JOHN HENRY JEFFREE.

REFERENCES CITED

The following references are of record in the file of this patent:

UNITED STATES PATENTS

| Number | Name | Date |
|---|---|---|
| 2,179,850 | Glancy | Nov. 14, 1939 |
| 2,314,838 | Kingston | Mar. 23, 1943 |

FOREIGN PATENTS

| Number | Country | Date |
|---|---|---|
| 229,445 | Great Britain | Feb. 26, 1925 |
| 490,381 | Great Britain | Aug. 15, 1938 |
| 496,257 | Great Britain | Nov. 28, 1938 |

OTHER REFERENCES

Central Scientific Company, Catalog J-141, published 1941, pages 1421 and 1425. (Copy in Design Division.)

Central Scientific Co., Booklet on Hartl Optical Disc No. 85,250, 12 pages, furnished by Central Scientific Co., Chicago, Ill. (pgs. 1-8 cited).